United States Patent

[72] Inventor James A. Taylor
 Lakeland, Fla.
[21] Appl. No. 786,754
[22] Filed Dec. 24, 1968
[45] Patented Sept. 21, 1971
[73] Assignee Wellman-Lord, Inc.

[54] PROCESS FOR RECOVERING SULFUR DIOXIDE
 10 Claims, No Drawings
[52] U.S. Cl................................................. 23/178,
 23/2 23/300
[51] Int. Cl......................................................... C01b 17/60
[50] Field of Search.......................................... 23/2, 114,
 130, 131, 177, 178, 178 S, 300, 302

[56] References Cited
 UNITED STATES PATENTS
 2,277,778  3/1942  Randall ........................ 23/302 X
 2,938,771  5/1960  Avedikian .................... 23/302 X

[11] 3,607,038

FOREIGN PATENTS
 418,255  10/1934  England ........................ 23/177

Primary Examiner—Oscar R. Vertiz
Assistant Examiner—Charles B. Rodman
Attorneys—John W. Behringer, Eugene L. Bernard, Martin J. Brown, James N. Dresser, W. Brown Morton, Jr., John T. Roberts, Malcolm L. Sutherland and Morton, Bernard, Brown, Roberts & Sutherland ABSTRACT: In a process for recovering $SO_2$ from an $SO_2$-containing gas, e.g., flue gas, by contacting the gas with an aqueous solution of a metal sulfite such as potassium, cesium, and rubidium sulfite to produce an aqueous solution of the corresponding metal bisulfite which is a precursor of $SO_2$, recovering the metal bisulfite therefrom as the corresponding metal pyrosulfite, and treating the metal pyrosulfite to produce $SO_2$, the improvement wherein the metal bisulfite is recovered by crystallizing it out of solution in the form of the corresponding metal pyrosulfite by adding to the solution methanol or ethanol, or mixtures of the two, while maintaining the resultant mixture at about 120° to 150° F.

PROCESS FOR RECOVERING SULFUR DIOXIDE

This invention relates to an improvement in the process for recovering sulfur dioxide from gases containing same by reacting said gases with an aqueous solution of a metal sulfite such as potassium, cesium, or rubidium sulfite to produce the corresponding bisulfite, recovering the bisulfite from the solution as the corresponding pyrosulfite, and then treating the pyrosulfite to produce sulfur dioxide. More particularly, it relates to an improvement whereby the metal bisulfite is recovered from its aqueous solution in the form of the corresponding metal pyrosulfite by mixing methanol or ethanol or mixtures thereof with the aqueous solution to crystallize out the bisulfite in the form of the corresponding metal pyrosulfite.

Sulfur dioxide is found in significant amounts as a constituent of many waste gases such as smelter gases, off-gases from many chemical plants, and stack or furnace gases from coal-burning furnaces such as used in electric power plants, and its concentration in such gases is from about 0.001 to less than about 0.5 mole percent (about 1 percent by weight). For example, a modern electric power plant of 1,350,000 kw. capacity will burn about 15,000 tons of coal per day. Much coal contains about 3.4 weight percent sulfur, or even more. The emission of sulfur dioxide from a plant of this size using such coal would then amount to about 1,000 tons per day, although the concentration of sulfur dioxide in the stack gases can be very low, for instance on the order of about 0.2 to 0.3 mole percent, depending upon the sulfur content of the coal.

A process directed to the recovery of $SO_2$ from such gases is disclosed in copending applications Ser. Nos. 616,682, filed Feb. 16, 1967, now abandoned, and 681,775, filed Nov. 9, 1967, of Terrana et al. and Ser. No. 681,680, filed Nov. 9, 1967, of Miller et al., all of said applications having common ownership with the present application. This process provides for the recovery of sulfur present as sulfur dioxide in such small concentrations as well as in large concentrations in gases and thus provides for significant abatement of sulfur dioxide pollution of air, although it is not limited thereto. Significant amounts, for instance greater than about 75 weight percent, of sulfur dioxide can be removed from such gases.

In accordance with this invention, sulfur dioxide in the sulfur dioxide-containing gas, e.g. a waste gas, is reacted with an aqueous solution of a metal sulfite as disclosed in the abovementioned applications. Suitable metal sulfides are the potassium, cesium, and rebidium sulfites. The reaction results in the formation of an aqueous solution of the corresponding metal bisulfite and substantial reduction of the sulfur dioxide content of the gas, for instance to less than about 0.2 mole percent in a stack gas containing more than about 0.2 mole percent. The metal bisulfite solution thus produced, which usually contains some unconverted metal sulfite as well, is added, along with methanol, ethanol, or mixtures of methanol and ethanol, to an agitated vessel wherein the rubidium bisulfite precipitates out of solution in the form of the corresponding metal pyrosulfite. While methanol and ethanol or both are generally suitable, ethanol has been found to be surprisingly more effective than methanol, despite the greater solubility of the latter in the system. As regards the metal sulfite employed in the process, the potassium salt is preferred.

Generally, a sufficient quantity of the monohydric alkanol is mixed with the aqueous bisulfite solution to effect crystallization from the solution of at least about 20, preferably at least about 25, percent of the metal bisulfite in the form of the corresponding metal pyrosulfite. The aqueous bisulfite solution resulting from the reaction of an aqueous solution of one of the aforementioned metal sulfites with a sulfur dioxide-containing waste gas, e.g., a stack gas, contains many ingredients. The following is exemplary

| Ingredient | Weight Percent Range | |
|---|---|---|
| | Generally | Usually |
| Metal Bisulfite | 5 to 40 | 10 to 30 |
| Metal Sulfite | 10 to 50 | 20 to 45 |
| Metal Sulfate | 0 to 8 | 1 to 6 |
| Water | balance | balance |

Such a metal bisulfite solution will generally have a total solids content of about 30 to 60, often about 50 to 55, weight percent, of which solids content the metal bisulfite (calculated as the corresponding metal pyrosulfite) may constitute about 20 to 30 percent, often about 24 to 26 percent, and metal sulfite about 15 to 30 percent. Frequently, then, the amount of monohydric alkanol required to effect crystallization of the desired amount of the metal pyrosulfite from such solutions will be about 50 to 100 percent, based on the weight of the aqueous bisulfite solution.

The mixing of the aqueous bisulfite solution and the monohydric alkanol is advantageously conducted by separately introducing the two components to the crystallization zone, the bisulfite solution at a temperature of about 120° to 160° F., preferably about 130° to 150° F., and the alkanol at a temperature from ambient to about 120° F., preferably about 80° to 110° F. Preferably, conditions in the crystallization zone, i.e., the mixing vessel, are maintained so as to provide a temperature therein of about 100° to 150° F., most preferably about 110° to 140° F. While, for economic reasons, the use of ambient pressure conditions in the crystallization zone is preferred, sub- and super atmospheric pressures can be employed as well. Where such crystallization zone temperatures near or above the normal boiling point are maintained, then superatmospheric pressures may be employed with advantage to keep the alkanol in solution. Also, reflux condensing means can be employed, if desired.

As the alkanol is admixed with the aqueous bisulfite solution and is dissolved therein, fine crystals of metal pyrosulfite are formed. Separation of the crystallized pyrosulfite from its mother liquor can be by known methods, for example by filtration, decantation, or centrifugation. The product metal pyrosulfite may be further treated in a number of ways to recover sulfur dioxide, for instance by thermal decomposition as disclosed in the aforementioned application Ser. No. 681,680 and in Ser. No. 681,643, filed Nov. 9, 1967, of Terrana et al., also having common ownership with the present application. And still another method of recovering the $SO_2$ from the pyrosulfite is that disclosed in applications Ser. No. 773,344 of Terrana et al., filed Nov. 4, 1968, and Ser. No. 786,756 of Miller et al., filed Dec. 24, 1968, said applications also having common ownership with the present application, which involves chemically reducing the pyrosulfite with a reducing agent such as carbon, carbon monoxide, hydrogen, or hydrogen sulfide to the corresponding metal sulfide and $SO_2$.

The mother liquor from the crystallization zone contains water and the alkanol and usually will contain some unrecovered bisulfite. Also, where the bisulfite solution being treated was originally obtained as a spent absorbing solution from the stripping of $SO_2$-containing gases with an aqueous solution of the corresponding metal sulfite, then, as mentioned above, there will usually be present in the mother liquor dissolved $SO_2$ partial pressure-lowering materials such as the corresponding metal sulfite and sulfate. Preferably, the separated mother liquor is sent to a rectification column to recover the alkanol as gaseous overhead; the recovered alkanol can then be recycled to the crystallization zone. Where sufficient quantities of unconverted metal sulfite are present in the mother liquor being sent to rectification, the liquid bottoms from rectification, which will contain the sulfite, can be advantageously recycled to the $SO_2$ absorption zone.

The invention will be better understood by reference to the following illustrative examples.

EXAMPLE I

Flue gas having the following approximate composition and obtained from a coal-burning furnace is treated for recovery of SO₂ therefrom according to the process of the present invention:

Flue Gas

| Ingredient | Mole Percent |
| --- | --- |
| Sulfur dioxide | 0.3 |
| Oxygen | 3.4 |
| Water vapor | 6.0 |
| Carbon dioxide | 14.2 |
| Nitrogen | 76.1 |
| Sulfur trioxide | 0.0003 |
| Fly ash | 0.3 grain per cubic foot |

The flue gas is introduced to an SO₂ absorber column at a temperature of about 300° F. and a flow rate of about 2000 actual cubic feet per minute (ACFM). Before entering the chemical absorption zone of the column, the flue gas is conducted through a scrubbing zone in the column wherein the gas is scrubbed with 0.1 gallon per minute (g.p.m.) of water to first remove other contaminants such as entrained particulate solid components, e.g., the fly ash, and more water-soluble components than the SO₂, e.g., the SO₃. Spent scrubbing water containing the removed fly ash and SO₃ is separated from the scrubbed gas and removed from the column. The scrubbed gas exits the scrubbing zone substantially free of the contaminants and passes into the absorption zone at a temperature of about 255° F. and a humidity of about 8 mole percent, the increased water content having been acquired in the scrubbing operation.

In the absorption zone of the column the scrubbed gas is countercurrently contacted with an aqueous absorbing solution of potassium sulfite which enters the column at a feed rate of about 68 pounds per minute and at a temperature of about 140° F. The entering absorbing solution has the following approximate composition:

Entering Absorbing Solution

| Ingredient | Weight Percent |
| --- | --- |
| Potassium sulfite | 30 |
| Potassium bisulfite (calculated as K₂S₂O₅) | 20 |
| Potassium sulfate | 2 |
| Water | 48 |

The temperatures of the scrubbed flue gas and of the entering potassium sulfite solution are high enough to maintain within the absorption zone a temperature sufficient to react the SO₂ in the scrubbed gas with the potassium sulfite in the absorbing solution to produce additional potassium bisulfite. Also, the flue gas vaporizes a portion of the water from the aqueous absorbing solution to provide a relative humidity of about 70 percent for the flue gas exiting the absorbing column for release to the atmosphere. The absorption zone temperature is not, however, kept so high as to cause the potassium bisulfite in the absorbing solution to decompose.

The flue gas is removed from the absorption zone and conducted to a third zone of the column, a demisting zone, wherein it is finally scrubbed with a portion of the entering potassium sulfite absorbing solution in an amount sufficient to remove entrained droplets and at least a portion of the sulfur dioxide remaining in the gas. The portion of the absorbing solution used to demist the gas is, together with the material entrained therein and the SO₂ absorbed thereby, conducted to the absorption zone wherein it is combined with the portion of the absorbing solution employed therein.

A major portion, e.g., about 90 percent of the SO₂ is removed, or stripped, from the scrubbed flue gas during its passage through the absorption and demisting zones. A spent absorbing solution is removed from the absorption zone at a temperature of about 140° F. It has the following approximate composition:

Spent Absorbing Solution

| Ingredient | Weight Percent |
| --- | --- |
| Potassium Sulfite | 25 |
| Potassium Bisulfite (calculated as K₂S₂O₅) | 25 |
| Potassium Sulfate | 2 |
| Water | 48 |
| Total Solids | 52 |

The spent absorbing solution is conducted to an open mixing vessel, equipped with a stirrer, at a feed rate of about 6 g.p.m. There is simultaneously fed to the mixing vessel about 4 g.p.m. of denatured ethanol ("Solox") at a temperature of about 85° F. The average temperature in the vessel ranges from about 115° to about 125° F. Fine crystals of potassium pyrosulfite are formed in the mixture according to the reaction:

$$2KHSO_3 H_2O \rightarrow K_2S_2O_5 + 2H_2O$$

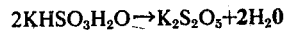

There is continuously withdrawn from the bottom of the vessel a slurry of the precipitated potassium pyrosulfite in its mother liquor, such withdrawal being at a rate sufficient to maintain a constant volume of contents in the vessel. The withdrawn slurry is conducted to a drum filter wherein the precipitated potassium pyrosulfite is separated from the mother liquor, the latter being obtained as filtrate having a pH in the range of about 7.0 to 7.2. A dried sample of the pyrosulfite is dissolved at 1 wt. percent concentration in water and the pH of the resulting solution determined to be in the range of about 5.6 to 5.8. The filtrate, or mother liquor, has the following approximate composition:

Mother Liquor

| Ingredient | Parts by Weight |
| --- | --- |
| Potassium Sulfite | 25 |
| Potassium Bisulfite (calculated as K₂S₂O₅) | 18 |
| Potassium Sulfate | 2 |
| Water | 48 |
| Ethanol | 67 |

Thus, there has been precipitated from the spent absorbing solution, in the form of potassium pyrosulfite, about 28 percent of the potassium bisulfite originally present therein.

The filtrate from the filer drum is conducted to a rectification column from which ethanol is removed as gaseous overhead at a temperature of about 180° F., condensed by cooling to about 100° F., and recycled to the mixing vessel. The bottoms from the rectification column are liquid at about 225° F. These are cooled in a heat exchanger to about 140° F. and then recycled to the fresh absorbing solution entering the SO₂ absorber column.

The crystallized potassium pyrosulfite removed from the filler drum is suitable for decomposing to release $SO_2$, for example by dissolving the pyrosulfite crystals in water, and steam stripping the solution to recover $SO_2$.

EXAMPLE II

The procedure of example I is repeated using methanol instead of ethanol. A 1 wt. percent aqueous solution of the crystallized potassium pyrosulfite obtained from the filter is determined to have a slightly higher pH, in the range of about 6.0 to 6.2, than that obtained in example I, and the filtrate is determined to have a slightly lower pH than obtained with ethanol, in the range of about 7.0 to 7.1, thus indicating that the use of methanol does not provide as high purity crystals as are obtained when ethanol is employed. (A 1 wt. percent aqueous solution of substantially pure potassium pyrosulfite exhibits a pH of about 4.4).

EXAMPLE III

Employing the procedure of example I, an aqueous solution of cesium sulfite is used to absorb $SO_2$ from flue gas, providing a spent absorbing solution of cesium bisulfite. The spent absorbing solution is further treated as in example I to recover cesium pyrosulfite therefrom.

EXAMPLE IV

Employing the procedure of example I, an aqueous solution of rubidium sulfite is used to absorb $SO_2$ from flue gas, providing a spent absorbing solution of rubidium bisulfite. The spent absorbing solution is further treated as in example I to recover rubidium pyrosulfite therefrom.

I claim:

1. In a process for recovering $SO_2$ from an $SO_2$-containing gas by conducting the gas to an absorption zone and contacting it therein with an aqueous absorbing solution comprising dissolved metal sulfite selected from the group consisting of potassium sulfite, cesium sulfite, and rubidium sulfite at a temperature to absorb $SO_2$ from the gas and produce an aqueous solution of the corresponding metal bisulfite which is a precursor of $SO_2$, said precursor-containing solution having a total solids content of about 30 to 60 weight percent, a metal bisulfite content of about 5 to 40 weight percent, an unconverted metal sulfite content of about 10 to 50 weight percent, and a corresponding metal sulfate content of 0 to about 8 weight percent, removing the precursor-containing solution from the absorption zone, recovering the bisulfite therefrom as the corresponding pyrosulfite, and treating the pyrosulfite to produce $SO_2$, the improvement wherein the bisulfite is recovered as pyrosulfite by introducing said precursor-containing solution at a temperature of about 120° to 160° F. to a crystallization zone maintained at a temperature of about 100° to 150° F., introducing monohydric alkanols selected from the group consisting of methanol, ethanol or a mixture of methanol and ethanol to said crystallization zone at a temperature from ambient to about 120° F., mixing said precursor-containing solution and said monohydric alkanol in the crystallization zone, said monohydric alkanol being introduced to said crystallization zone in amounts of about 50 to 100 percent, based on the weight of the precursor-containing solution introduced thereto, and sufficient to effect crystallization from the solution of at least about 20 percent of the metal bisulfite in the form of the corresponding metal pyrosulfite.

2. In a process for recovering $SO_2$ from an $SO_2$-containing gas by conducting the gas to an absorption zone and contacting it therein with an aqueous absorbing solution comprising dissolved potassium sulfite at a temperature to absorb $SO_2$ from the gas and produce an aqueous solution of potassium bisulfite which is a precursor of $SO_2$, said precursor-containing solution having a total solids content of about 30 to 60 weight percent, a potassium bisulfite content of about 10 to 30 weight percent, an unconverted potassium sulfite content of about 20 to 45 weight percent, and a potassium sulfate content of about 1 to 6 weight percent, removing the precursor-containing solution from the absorption zone, recovering the potassium bisulfite therefrom as potassium pyrosulfite, and treating the potassium pyrosulfite to produce $SO_2$, the improvement wherein the potassium bisulfite is recovered as potassium pyrosulfite by introducing said precursor-containing solution at a temperature of about 120° to 160° F. to a crystallization zone maintained at a temperature of about 100° to 150° F., separately introduced to said crystallization zone ethanol at a temperature from ambient to about 120° F., mixing said precursor-containing solution and said ethanol in the crystallizaton zone, said ethanol being introduced to said crystallization zone in amounts of about 50 to 100 percent, based on the weight of the precursor-containing solution introduced thereto, and sufficient to effect crystallization from the solution of at least about 20 percent of the potassium bisulfite in the form of potassium pyrosulfite, separating the crystallized potassium pyrosulfite from its mother liquor, and rectifying the separated mother liquor to recover the ethanol therefrom as gaseous overhead and water as liquid bottoms.

3. The improvement of claim 2 wherein the potassium sulfite-containing bottoms recovered by the rectificaton of the filtrate are recycled to said aqueous absorbing solution.

4. The improvement of claim 1 further including separating the crystallized metal pyrosulfite from its mother liquor and rectifying the separated mother liquor to recover the monohydric alkanol therefrom as gaseous overhead and water as liquid bottoms.

5. The improvement of claim 1 wherein the metal is potassium.

6. The improvement of claim 4 wherein the metal is potassium.

7. The improvement of claim 1 wherein the monohydric alkanol is ethanol.

8. The improvement of claim 4 wherein the monohydric alkanol is ethanol.

9. The improvement of claim 5 wherein the monohydric alkanol is ethanol.

10. The improvement of claim 6 wherein the monohydric alkanol is ethanol.